April 14, 1970

F. H. MIYANAGA 3,506,282

SPRING MOUNTED FENDER BRACKET

Filed Sept. 11, 1968

INVENTOR.
FRANK H. MIYANAGA

BY *Jack M. Wiseman*

ATTORNEY

United States Patent Office 3,506,282
Patented Apr. 14, 1970

3,506,282
SPRING MOUNTED FENDER BRACKET
Frank H. Miyanaga, 1726 Mossbrook Ave.,
San Jose, Calif. 95130
Filed Sept. 11, 1968, Ser. No. 758,964
Int. Cl. B62b 9/16
U.S. Cl. 280—152    3 Claims

ABSTRACT OF THE DISCLOSURE

A fender bracket that is mounted on the spring structure of a vehicle so that a fender attached to the bracket can follow the up and down motion of the tires as the vehicle travels over a road or highway. By installing the bracket on the vehicle spring structure, the fenders on a truck tractor, for example, can be mounted so that a minimum of clearance exists between the vehicle tires and the fenders. Such mounting and installation of the fender bracket and fender prevents damage to the fender by eliminating contact between the fender and the underside of a van or flat bed trailer when the van or trailer is in a loaded condition. The fender is attached to the fender bracket in such manner as to allow swinging action of the fender to facilitate removal of the vehicle tires.

The present invention relates generally to the mounting of fender brackets and fenders on the spring structure of a vehicle to provide a minimum clearance between the vehicle tires and the fender to prevent damage to said fender when said vehicle is towing a trailer or the like.

BACKGROUND OF THE INVENTION

Considerable damage is done to fenders mounted in a conventional manner on a truck tractor when the tractor is pulling a loaded van or trailer. Conventional mounting of fenders consists of bolting or welding the fender, or bracket supporting the fender, to the frame of the truck tractor, and such mounting requires the allowance of a large clearance between the tires and the fenders so that the tires will not be driven into the fenders as a result of compression of the tractor springs when the tractor is under a loaded trailer. Because of this large clearance between the tires and the fenders, the fenders can easily contact the underside of a trailer and become damaged thereby. It is to this problem of large clearance between the fenders and the vehicle tires that the present invention is directed so that damage to the fenders is minimized when the vehicle is pulling a trailer or the like.

SUMMARY OF THE INVENTION

In general terms, it is an object of the present invention to provide a fender bracket and mounting for a vehicle that affords minimal clearance between the vehicle tires and a fender mounted on said bracket. Specifically, by way of example, mounting the fender bracket on the spring structure of the vehicle allows the fender to follow the up and down motion of the tires as the vehicle travels over the road or highway. By keeping the clearance between the fenders and tires at a minimum, the likelihood of the fenders striking the underside of a trailer or van pulled by said vehicle is essentially eliminated. Further, the fender is so mounted on the fender bracket that the fender can swing with the fender bracket to facilitate removal of vehicle tires.

Further, fastening structure already associated with the vehicle springs is utilized to secure the improved fender bracket and mounting structure.

It is therefore an object of the invention to provide an improved fender bracket for mounting fenders on a vehicle at a minimal distance from the tires of the vehicle.

It is another object of the invention to provide an improved fender support relative to the tires to minimize damage to said fenders.

It is a further object of the invention to mount the fenders of a vehicle on the spring structure of the vehicle so that the vehicle tire movement and fender movement is in phase.

These and other objects will be apparent from the following description and drawings.

DESCRIPTION OF THE PREFERRED EMBODIMENT

Figure 1:
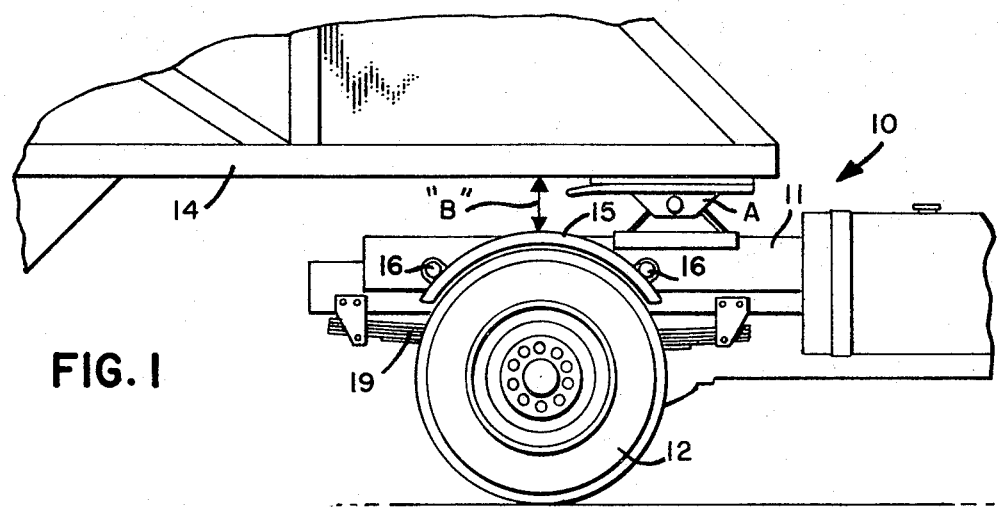
FIGURE 1 is a partial elevation of the rear wheels of a truck tractor pulling a trailer wherein the clearance between the trailer and the truck fender is delineated.

Referring now to FIGURE 1, a truck-tractor 10 is shown having a frame 11 supported on wheels 12 as by spring structure 13. A trailer 14 is attached to the tractor 10 by conventional structure as at A. Immediately adjacent the wheel 12 is a fender 15, which is supported by fender brackets 16. It is noted that a clearance "B" is provided between the fender 15 and the underside of the trailer 14. The brackets 16 are attached to the spring structure 13 as best shown in FIGS. 2 and 3.

As the truck-tractor 10 moves along the road, the frame 11 moves relative to the wheels 12 by reason of the action of the spring structure 13 when bumps or other uneven portions of the roadway are encountered. With the fender 15 being attached to the spring structure by the brackets 16, the fender 15 stays in close relationship to the wheel 12 and does not strike the underside of the trailer 14. Even with the trailer loaded, the fender 15 does not tend to rub or strike the trailer 14, and the clearance between the fender 15 and the wheel 12 remains substantially the same.

Figure 2:
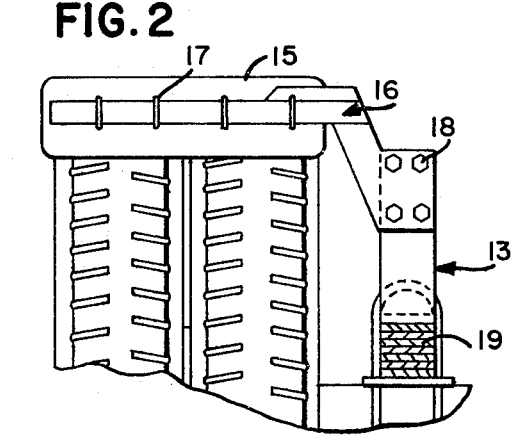
FIGURE 2 is an enlarged plan view showing the fender and fender bracket mounted to the springs of the truck of FIGURE 1 in accordance with the invention.

Referring now to FIGURE 2, it can be seen that the fender 15 is attached to the fender bracket 16 by a plurality of U-bolts 17. The bracket 16 is secured to the spring structure 13 by bolts 18.

Figure 3:
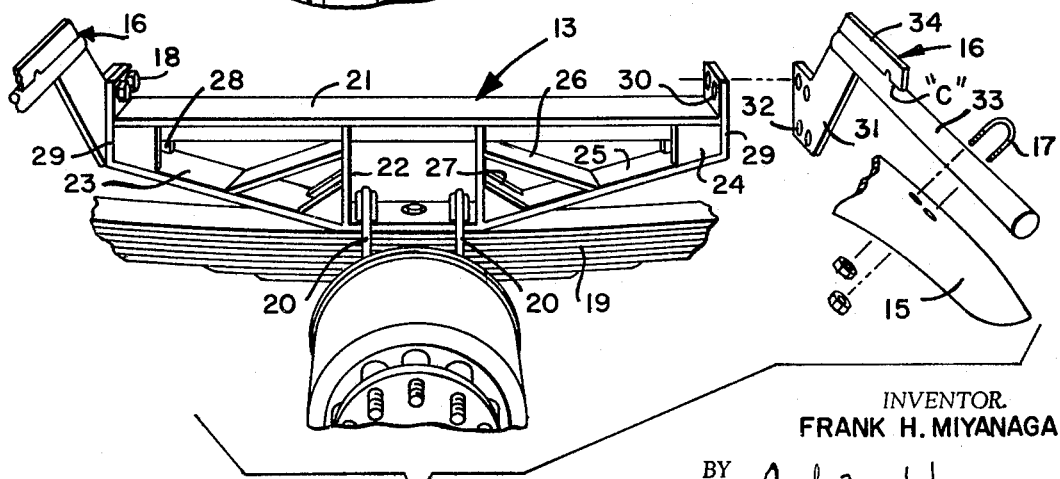
FIGURE 3 is an exploded perspective view disclosing the invention as applied to the spring structure of a truck.

In FIGURE 3, the spring structure 13 is mounted on leaf springs 19 by U-bolts 20. The spring structure 13 comprises a T-beam member 21 welded to supporting members 22, 23, 24, 25, 26, 27 and 28. At each end of T-beam member 21, end plates 29 are welded thereto and provided with bolt openings 30 to receive bolts 18. Thus, the spring structure 13 is supported by and secured to leaf springs 19 so that the spring structure moves with the truck springs.

The fender bracket 16 comprises an attachment plate 31 provided with openings 32 through which bolts 18 are inserted to secure the fender bracket 16 to the spring structure 13. A support rod 33, bifurcated as at C, allows the insertion of attachment plate 31 wherein the plate and rod are secured together as by welding or the like. The upper portion 34 of plate 31 provides additional rigidity for the fender bracket to hold the fender 15 solidly over the wheels 12. The fender 15 is attached to the support rod 33 by U-bolts 17.

If it is necessary to replace a fender 15, the U-bolts 17 are loosened, and the fender is slipped off the support rod and a new fender is attached to the support rod.

Figure 4:
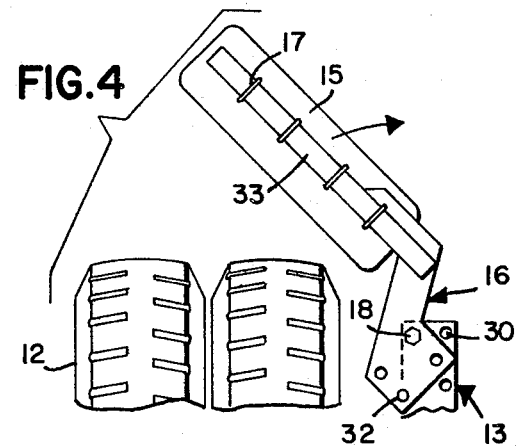
FIGURE 4 is a partial plan view of the fender and bracket of the invention shown pivoted away from the truck tires to facilitate removal of same.

In FIGURE 4, all the bolts 18 have been removed from the fender bracket 16 except one. By loosening the remaining bolt 18, the fender bracket and fender may be pivoted away from the tires to facilitate removal of the tires. The fender and bracket may be pivoted back into position relative to the end plates 29 of spring structure 13, and the bolts 18 can again be inserted and tightened.

Thus a fender and fender bracket has been described wherein the bracket is mounted on a spring structure 13. As the spring structure moves with the springs 19 and wheels 12, the fender tends to remain within minimal clearance of the wheels regardless of trailer loading and irregularity of the road surface, thereby avoiding damage to the fenders.

What is claimed is:

1. A fender mounting for a vehicle having a spring mounted axle comprising, in combination:
 a spring structure secured to said vehicle spring for movement therewith;
 a fender bracket attached to said spring structure;
 a fender member mounted on said fender bracket and supported by the bracket, the fender member positioned in an operative position immediately adjacent a wheel of said vehicle to provide minimal clearance between said wheel and said fender member, said fender member thereby moving with the movement of said spring structure to maintain said clearance between said fender member and vehicle wheel regardless of loading on the axle of said vehicle; and
 pivot means intermediate and engaging the fender bracket and the spring structure for allowing the fender bracket and the fender member to be positioned about the pivot means away from and towards said operative position.

2. A fender mounting for a vehicle having a spring mounted axle comprising, in combination:
 a spring structure means mounted for movement with the springs of said vehicle, the spring structure means including a beam member secured to said springs, the beam member engaging end plates adapted to engage a fender member;
 a fender member engaging said end plates, the fender member positioned in an operative position to provide minimal clearance between the fender member and associated wheel of said vehicle, said fender member moving responsive to movement of said spring structure and said springs to maintain said minimal clearance in the operative position during vehicle movement over a road surface or the like; and
 pivot means intermediate and joined to the fender member and the spring structure for allowing the fender member to be pivoted about the structure and positioned away from and towards said operative position.

3. The fender mounting of claim 2 further including fender brackets engaging the fender member and the end plates, the pivot means being intermediate and engaging the brackets and the spring structure for allowing the fender bracket and the fender member to be positioned about the pivot means away from and towards said operative position.

References Cited

UNITED STATES PATENTS

| | | | |
|---|---|---|---|
| 480,485 | 8/1892 | Anerssen | 280—157 |
| 2,660,443 | 11/1953 | Miller | 280—152 |
| 2,771,304 | 11/1956 | La Pere | 280—152 |
| 2,972,149 | 2/1961 | Bracesco | 280—152 |

LEO FRIAGLIA, Primary Examiner

R. R. SONG, Assistant Examiner

U.S. Cl. X.R.

280—423